Sept. 20, 1966 L. H. WALKER 3,274,480
CONTROL ARRANGEMENT FOR LIMITING THE PEAK
INSTANTANEOUS VOLTAGE FROM AN
A.C. POWER SOURCE
Filed Oct. 12, 1962 8 Sheets-Sheet 1

INVENTOR.
LOREN H. WALKER

BY
Isidore Match
ATTORNEY

Sept. 20, 1966 L. H. WALKER 3,274,480
CONTROL ARRANGEMENT FOR LIMITING THE PEAK
INSTANTANEOUS VOLTAGE FROM AN
A.C. POWER SOURCE
Filed Oct. 12, 1962 8 Sheets-Sheet 7

FIG. 9a

VOLTAGE OUT OF TERTIARY 30c

FIG. 9b

VOLTAGE OUT OF TERTIARY 36c

FIG. 9c

SUM OF WAVEFORMS OF FIGS. 9a AND 9b

INVENTOR.
LOREN H. WALKER
BY Isidore Match
ATTORNEY

INVENTOR.
LOREN H. WALKER
BY Isidore Match
ATTORNEY

United States Patent Office 3,274,480
Patented Sept. 20, 1966

3,274,480
CONTROL ARRANGEMENT FOR LIMITING THE PEAK INSTANTANEOUS VOLTAGE FROM AN A.C. POWER SOURCE
Loren H. Walker, Waynesboro, Va., assignor to General Electric Company, a corporation of New York
Filed Oct. 12, 1962, Ser. No. 230,139
15 Claims. (Cl. 321—61)

This invention relates to control circuits. More particularly, it relates to a circuit for limiting the peak instantaneous voltage from an alternating current power source.

With the appearance of the silicon controlled rectifier, there has been enabled the development of static solid state frequency conversion systems for high power applications which effect a great saving in weight, are reliable, and permit a great saving in maintenance costs. Such frequency conversion systems, for example, may be utilized for converting the output of a single phase or polyphase substantially constant frequency generator to a single or polyphase output of a different frequency, and, most importantly, may be used to convert the output of a polyphase generator having an indeterminate, i.e., variable output frequency to a single or polyphase output having a determinate range of frequencies. The importance of the latter application can be readily appreciated when it is realized that it is most advantageously used in situations wherein a generator is actuated by a variable speed source of a relatively high frequency such as an airplane engine and it is desired to convert the output of such generator to a power output having a constant and appreciably lower frequency.

Heretofore, a limitation on the capabilities of such frequency conversion systems has been the peak inverse voltage rating of the silicon controlled rectifiers which are utilized as the power switching devices, i.e., the frequency conversion devices therein. Since reverse breakover in silicon controlled rectifiers is substantially instantaneous, and, since even short-time breakovers are damaging to the junctions therein, over-voltage transients in the output of the generator whose frequency is to be converted and which have a duration of only a few microseconds, cannot be tolerated. However, it is desirable to use the power switching silicon controlled rectifiers without derating their peak inverse voltage.

Accordingly, it is an important object of this invention to provide a circuit for preventing the instantaneous line voltage of an alternating current generator from exceeding a chosen value.

It is a further object to provide a circuit in accordance with the preceding object which is simple, utilizes relatively few circuit components, and has an extremely fast response.

It is another object to provide an arrangement wherein the action of a circuit provided in accordance with the preceding objects is correlated with the action of a voltage regulator in an alternating current generator system.

Generally speaking and in accordance with the invention, there are provided in combination with an alternating current power source, a parallel arrangement of oppositely poled gate controlled rectifiers connected across the source, each of the gate controlled rectifiers comprising an anode, a cathode, and a gate electrode. Means are provided connected across the source for producing gating signals for the silicon controlled rectifiers in response to an output voltage from the source which exceeds a chosen level to render the gate controlled rectifiers respectively conductive and thereby reduce such output voltage to a level which is less than the aforesaid chosen value. Means are also provided responsive to conduction in each of the gate controlled rectifiers for producing a potential in additive relationship with the output of the signal producing means to continually provide gating signals to each of the gate controlled rectifiers respectively at the point in alternately occurring half cycles of output from the source, that the source voltage attains a value exceeding the chosen value.

The features of this invention, which are believed to be new, are set forth with particularity in the appended claims. The invention itself, however, may best be understood by reference to the following description when taken in conjunction with the accompanying drawings which show embodiments of a control arrangement in accordance with the invention.

Figure 1:
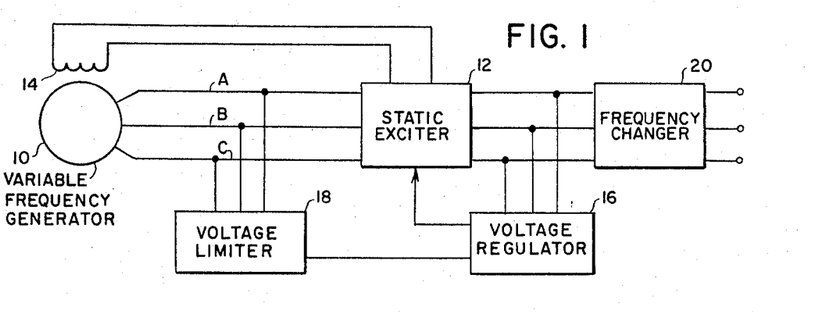
FIG. 1 is a block diagram of an example of a system wherein the voltage limiter circuit and the arrangement for correlating the action of such voltage limiter with a voltage regulator in accordance with the principles of the invention may be advantageously utilized.

Referring now to FIG. 1, there is shown therein in block diagram depiction, an arrangement for converting the variable frequency output of a three phase generator to a three phase output having a determinate range of frequencies, the latter frequencies being substantially less than the lowest frequency of the generator outptut.

Thus, the variable frequency three phase generator 10 is actuated by an exciter 12 which may suitably be of the static type, the output of exciter 12 providing a unidirectional potential for energizing the field winding 14 of generator 10. The voltage of the output of generator 10 is regulated by a voltage regulator 16, such regulation actually being effected by the regulation of the output of exciter 12. The voltage limiter stage 18 which is a limiter circuit in accordance with the principles of the invention functions to substantially instantaneously reduce voltage transients produced by generator 10 to a level not exceeding a chosen level. It is seen in the arrangement of FIG. 1 that voltage limiter 18 functions in operative association with voltage regulator 16 as will be further explained hereinbelow.

The frequency changer 20 has applied thereto, the voltage regulated, transient limited, output of generator 10 and contains means for converting this output to a three phase output having a frequency appreciably less than the lowest frequency output produced by generator 10. Such frequency changer within the contemplation of this invention suitably contains silicon controlled rectifiers as the power switching devices therein. Frequency changer 20 may be of the type disclosed in the patent application of David L. Plette for Frequency Converter, Serial Number 122,278, filed July 6, 1961, and in the patent application of Lawrence R. Peaslee for Frequency Converter, Serial Number 129,646, filed August 7, 1961, now Patent No. 3,152,297, both of these applications being assigned to the General Electric Company.

Figure 2:
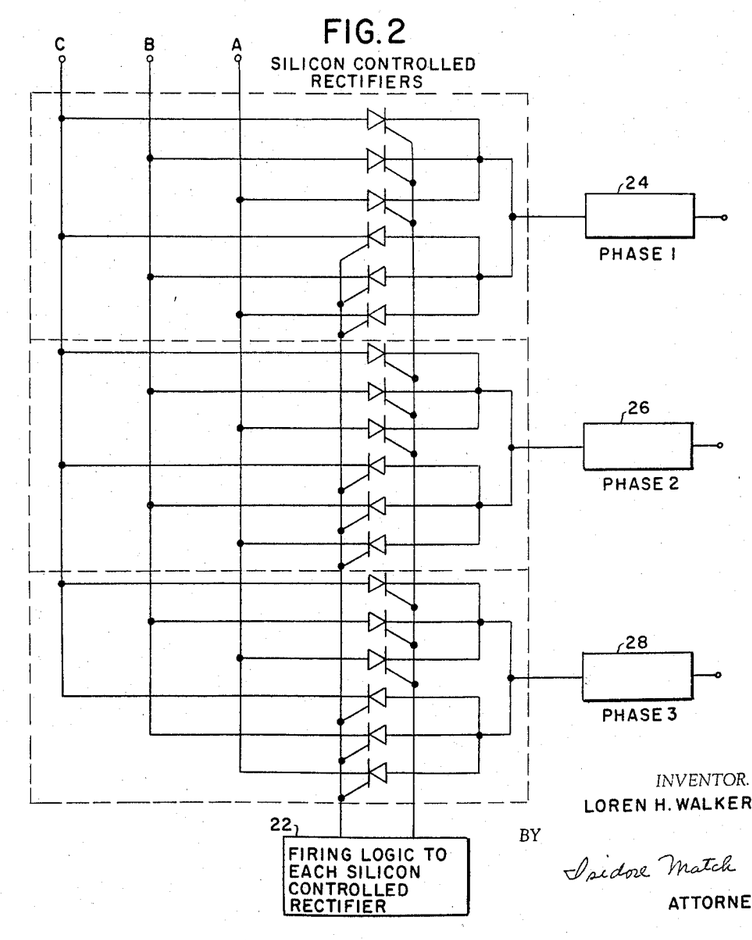
FIG. 2 is a diagram of the combination of the gate controlled rectifiers contained in the frequency changer stage of the system of FIG. 1.

In FIG. 2 there is shown a diagram which sets forth in a simple manner the concept of frequency changing as accomplished by frequency changer 20 in the system of FIG. 1. It is seen in FIG. 2 that each phase of the frequency changer comprises three pairs of oppositely poled silicon controlled rectifiers, each of such pairs of silicon controlled rectifiers in a phase having applied thereto one of the outputs, viz., A, B, or C outputs of variable frequency three phase generator 10. The gating into conductivity of the silicon controlled rectifiers is determined by firing logic stage 22, as disclosed in the aforementioned patent applications. The outputs of the six silicon controlled rectifiers comprising each phase respectively are combined and the three separate combined outputs are filtered in low pass filters 24, 26 and 28 to provide three balanced phase substantially sinusoidal outputs having a determinate range of frequencies, the highest of which is substantially less than the lowest frequency of the output of generator 10. It is the frequency changing silicon controlled rectifiers of FIG. 2 which it is desired to protect from voltage transients produced by generator 10 without derating their peak inverse voltage.

Figure 3:
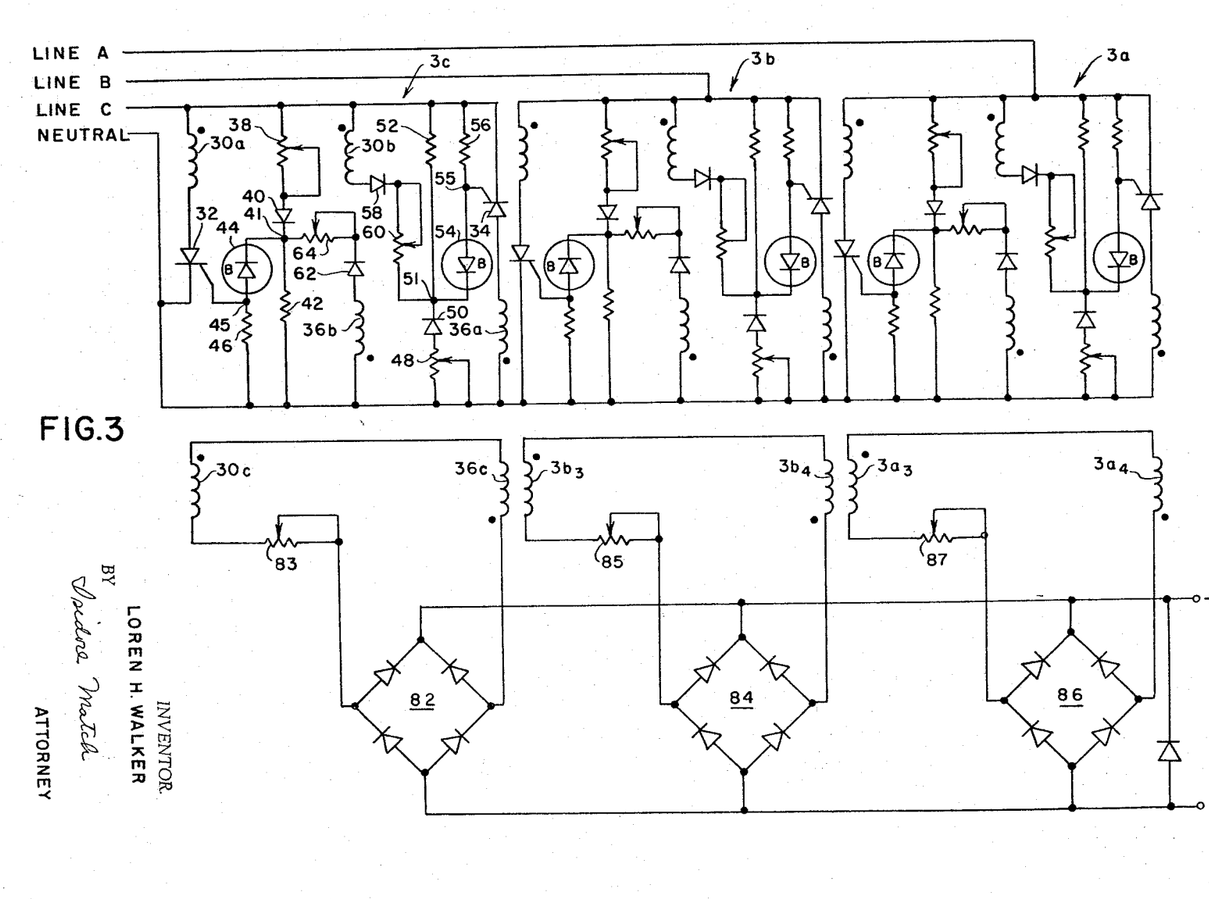
FIG. 3 is a schematic diagram of a voltage limiter circuit in accordance with the principles of the invention.

In FIG. 3, there is shown an arrangement of three identical circuits, 3a, 3b and 3c, constructed in accordance with the principles of the invention for limiting voltage transients on the output lines A, B, and C of generator 10. In other words, the arrangement of FIG. 3 is the voltage limiter 18 of FIG. 1. Since these circuits, viz., circuits 3a, 3b, and 3c are alike, only the one to which the voltage from line C is applied will be described.

Accordingly, in circuit 3c, a series arrangement of an inductor 30a and the anode to cathode path of a silicon controlled rectifier 32 is connected between line C and neutral and correspondingly a series arrangement of the cathode to anode path of a silicon controlled rectifier 34 and an inductor 36a is also connected between line C and neutral. Also connected between line C and neutral is a series arrangement of a variable resistor 38, the anode to cathode path of a diode 40 and a resistor 42, the junction 41 of the cathode of diode 40 and resistor 42 being connected to neutral through a series arrangement of the cathode to anode path of a breakdown diode 44 and a resistor 46. Correspondingly, between neutral and line C, there is connected a series arrangement of a variable resistor 48, the anode to cathode path of a diode 50 and a resistor 52, the junction 51 of the cathode of diode 50 and resistor 52 being connected to line C through the series arrangement of the cathode to anode path of a breakdown diode 54 and a resistor 56. The junction 45 of the anode of breakdown diode 44 and resistor 46 is connected to the gate electrode of silicon controlled rectifier 32 and the junction 55 of the anode of breakdown diode 54 and resistor 56 is connected to the gate electrode of silicon controlled rectifier 34.

Connected between line C and junction 51 is the series arrangement of an inductor 30b, the anode to cathode path of a diode 58 and a variable resistor 60 and connected between neutral and junction 41 is the series arrangement of an inductor 36b, the anode to cathode path of a diode 62 and a variable resistor 64. Inductors 30a and 30b are in transformer relationship and, effectively, they may be considered the primary and secondary windings respectively of a transformer. Similarly, inductors 36a and 36b are in transformer relationship and may also be considered the primary and secondary windings respectively of a transformer.

Considering the operation of circuit 3c, the value of the setting on resistor 38, the value of resistor 42, and the value of the forward resistance of diode 40 are so chosen whereby, when the voltage on line C exceeds a chosen level during a positive half cycle, diode 44 breaks down to draw a small amount of current through resistor 46. The voltage which consequently appears across resistor 46 is applied to the gate electrode of silicon controlled rectifier 32 to render it conductive and current flows through inductor 30a and silicon controlled rectifier 32. Similarly, the value of the setting on resistor 48 and the values of resistor 52 and the forward resistance of diode 50 are so chosen whereby, when the voltage on line C exceeds the chosen voltage level during the negative half cycle of output from generator 10, diode 54 breaks down and the consequent current flowing through resistor 56 effects the gating into conductivity of silicon controlled rectifier 34. During a half cycle of generator output when the corresponding silicon controlled rectifier is rendered conductive, the line voltage is consequently dropped below the chosen level, thereby removing the signal from the gate of the conducting silicon controlled rectifier but leaving such silicon controlled rectifier in the conducting state. Once such silicon controlled rectifier is conducting, it behaves like any other rectifier and remains in the conductive state until the current therethrough goes to zero and a reverse voltage is applied thereto. The values of inductors 30a and 36a are so chosen that the maximum voltage that generator 10 produces is attenuated by the current of circuit 3c to the maximum voltage which may be applied to the load, i.e., the frequency changing silicon controlled rectifiers. Accordingly, the peak line voltage applied to the frequency changer is equal to or less than the chosen value.

Figure 4A:
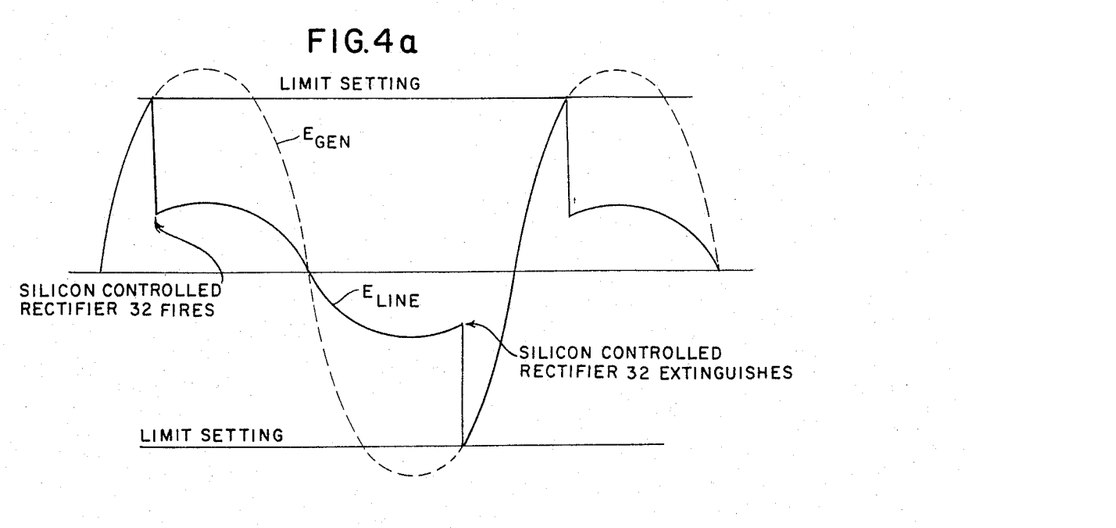
FIGS. 4 to 6 are timing diagrams of waveforms conveniently utilized in explaining the operation of the circuit of FIG. 3.
Figure 4B:
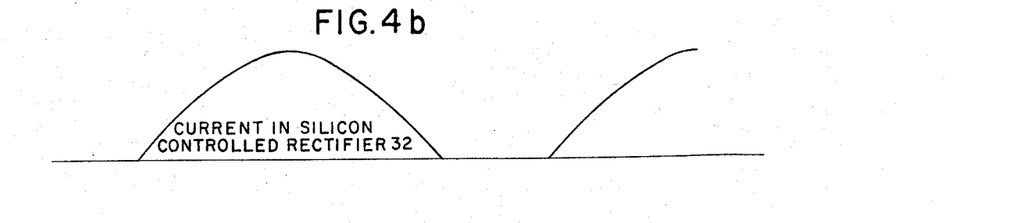

Since a silicon controlled rectifier in circuit 3c has an inductive load, the current does not reverse therein until all the energy in the inductor has been returned to line C. If it were assumed that circuit 3c merely contained the series arrangement of inductor 30a and silicon controlled rectifier 32 together with the series arrangement of resistor 38, diode 40 and resistor 42 with the series combination of breakdown diode 44 and resistor 46 in shunt with resistor 42, then the voltage waveform would appear as shown in FIG. 4a. In FIG. 4a the bold line would be the waveform of the voltage appearing on line C and the dashed line would be that portion of generator output voltage which would be removed due to the action of inductor 30a and silicon controlled rectifier 32. FIG. 4b shows the current that would flow through silicon controlled rectifier 32 in such a situation.

Figure 5A:
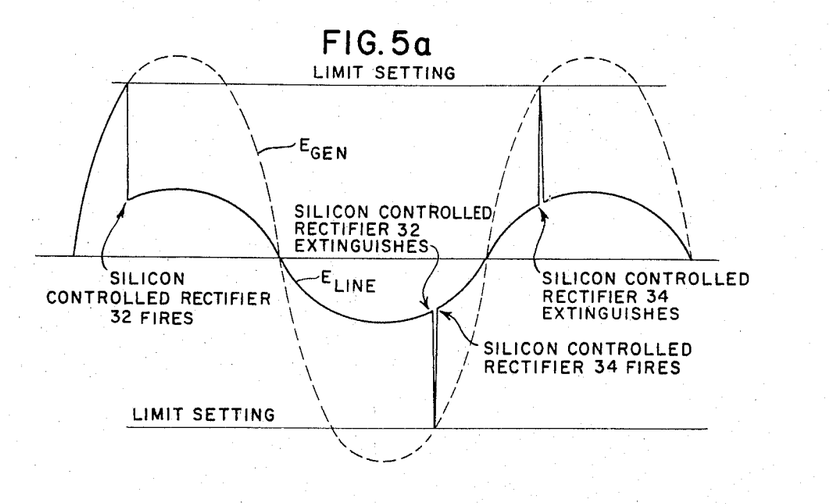
Figure 5B:
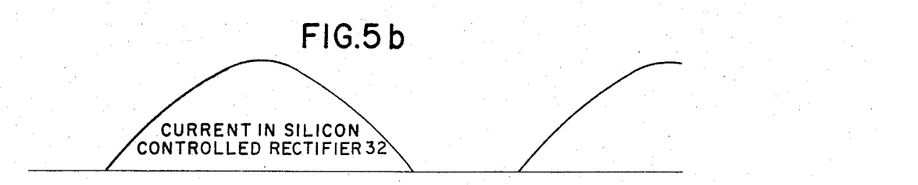
Figure 5C:
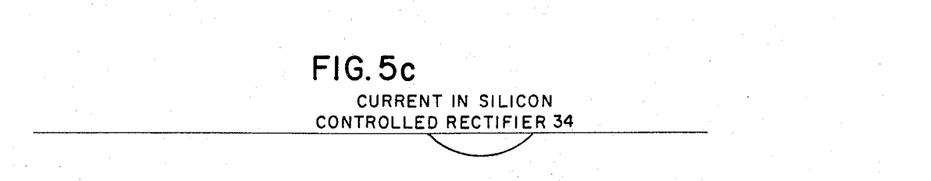

If it is now further assumed that circuit 3c also contained, together with the arrangement as assumed above, the series arrangement of silicon controlled rectifier 34 and inductor 36a connected in parallel with the series arrangement of resistor 52, diode 50 and resistor 48, with the series combination of breakdown diode 54 and resistor 56 in shunt with resistor 52, then the voltage waveforms would be as shown in FIG. 5a, the waveform of the current waveform through silicon controlled rectifier 32 would be as shown in FIG. 5b, and the waveform of the current through silicon controlled rectifier 34 would be as shown in FIG. 5c.

To understand the waveforms of FIG. 5, let it be assumed that the first half cycle shown in FIG. 5a would be the first cycle in which the voltage output from generator 10 woud rise above the desired level, as shown by the limit setting lines, on a transient. Since this transient during the positive half cycle would cause silicon controlled rectifier 32 to be rendered conductive to reduce the voltage as shown by the bold line, $E_{line}$, consequently, silicon controlled rectifier 34 would not be subjected to an overvoltage until silicon controlled rectifier 32 would cease conduction as shown by the leading edge of the spike in the negative half cycle. At the time that silicon controlled rectifier 32 would cease to conduct, the line voltage would increase greatly in the negative direction to render silicon controlled rectifier 34 conductive and then fall back steeply as silicon controlled rectifier 34 conducts. Since there is a finite delay time after the application of a gating signal to a silicon controlled rectifier before it starts to conduct (at least one microsecond), the line voltage could rise all the way to the generator voltage before the limiting action provided by conduction in a silicon controlled rectifier could commence. Accordingly, in the assumed circuit, each half cycle would have a voltage spike as shown in FIG. 5a.

In FIG. 5a, it is to be further noted that initially silicon controlled rectifier 32 is extinguished and silicon controlled rectifier 34 is rendered conductive quite late in the negative half cycle of generator output but that silicon controlled rectifier 34 is extinguished and silicon controlled rectifier 32 is rendered conductive quite early in the positive half cycle of generator voltage output. This can be understood when it is realized that since silicon controlled rectifier 32 would be so rendered conductive quite early in the positive half cycle, the effect of the presence of inductor 30a would be to prolong conductivity therein for a good portion of the negative half cycle as shown in FIG. 5b. Conversely, since silicon controlled rectifier 34 would be fired late in the negative half cycle, it would be extinguished early in the positive half cycle as shown in FIG. 5c. As the steady state is approached in the situation where the generator voltage exceeds the limit setting for a measurable period, the voltage spikes in the positive half cycles would progress to a point therein wherein they would steadily occur just before the half cycle peaks and, similarly, the voltage spikes in the negative half cycles would move in a direction wherein they would steadily occur at a point just beyond the half cycle peaks. In the example assumed in FIG. 5a, the spikes would never quite hit the peaks and would occur in the above described manner due to the fact that the initial half cycle of voltage which exceeds the limit setting occurs in the positive half cycle. The settings of variable resistors 38 and 48, of course, determine the chosen limit setting.

To eliminate the voltage spikes, as shown in FIG. 5, from the line voltage, the respective series combinations of inductor 30b, diode 58 and variable resistor 60, and inductor 36b, diode 62 and variable resistor 64 respectively have been provided in circuit 3c and correspondingly in circuits 3a and 3b.

Thus, with the circuit of 3c as shown, assuming that an overvoltage transient occurs at the output of generator 10 during the positive half cycle, silicon controlled rectifier 32 is consequently rendered conductive. The voltage developed thereby across inductor 30a is transformed to inductor 30b and a portion of such voltage accordingly appears at junction 51. Thus, when the negative half cycle of voltage appears on line C, and with current still flowing in the series combination of inductor 30a and silicon controlled rectifier 32, because of the action of inductor 30a, the voltage at junction 51 is equal to that determined by the voltage divider comprising resistor 48, diode 50 and resistor 52 plus the voltage provided by the transformer action between inductors 30a and 30b as modified by the forward resistance of diode 58 and resistor 60. The value of the ratio of the winding turns of inductors 30a and 30b, the forward resistance of diode 58 and the value of resistor 60 are so chosen whereby the voltage, which is applied to the series combination of breakdown diode 54 and resistor 56, is one which has a value equal to what would have been the value of the voltage at junction 51 had a voltage exceeding the predetermined value appeared on line C and had there been no conduction in silicon controlled rectifier 32. In other words, the voltage at junction 51 is projected to a value which is equal to one that would be derived from an overvoltage. Accordingly, as far as silicon controlled rectifier 34 is concerned, it is rendered conductive as if an overvoltage were present during each negative half cycle. The transformer arrangement of inductors 36a and 36b together with diode 62 and resistor 64 function in a corresponding manner to similarly project the voltage at junction 41 to one sufficiently high to render silicon controlled rectifier 32 conductive during the positive half cycle of line volage even though no overvoltage actually exists in line C.

Figure 6A:
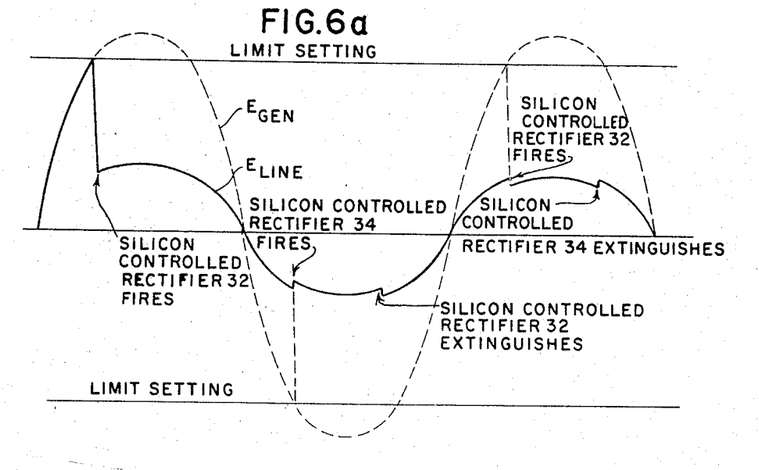
Figure 6B:
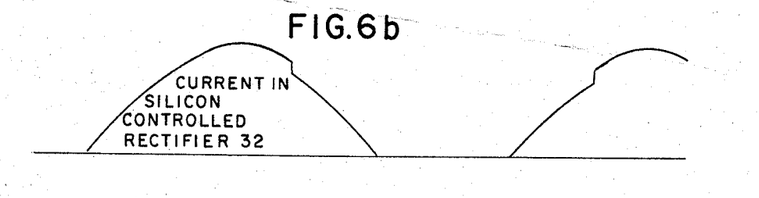
Figure 6C:
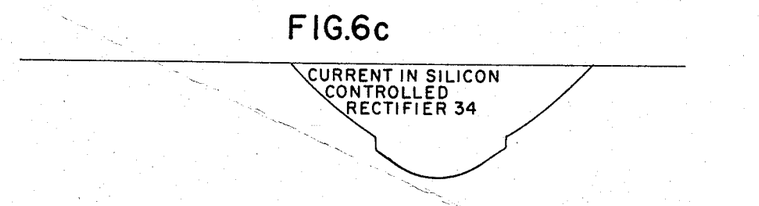

In FIG. 6a, there is shown the waveform that is provided by each of the corresponding circuits, viz. 3a, 3b, and 3c, of FIG. 3. The bold line therein is the line voltage, $E_{line}$, and the dashed line is the overvoltage from generator 10. It is seen in FIG. 6a that each silicon controlled rectifier 32 or 34 commences to conduct in the positive and negative half cycle respectively when the projected generator voltage would have attained the limit setting of the other silicon controlled rectifier had not been conducting. Since conduction in inductors 30a and 36a are for almost equal times during positive and negative voltage half cycle, because of very low inductor losses, and since the firing of the silicon controlled rectifiers as shown in FIG. 6a always occurs prior to the peak of the respective half cycles, there is always an overlap between the rendering conductive of one silicon controlled rectifier and the rendering nonconductive of the other silicon controlled rectifier. Accordingly, the spikes shown in FIG. 5a never occur with the arrangement of FIG. 3. As the generator voltage progressively increases further beyond the limit setting, the overlap between the rendering conductive of the extinguished silicon controlled rectifier and the rendering nonconductive of the conducting silicon controlled rectifier during a half cycle will progressively cover more of the half cycle. In other words, each silicon controlled rectifier is rendered conductive earlier in its corresponding half cycle and thus conducts later in the other half cycle due to the action of the corresponding inductors.

It is to be noted that with each of the circuits of FIG. 3, when the generator voltage drops below the limit, the voltages at junctions 41 and 51 drop almost immediately to values below that which is necessary to fire the silicon controlled rectifiers 32 and 34 and voltage limiting action ceases.

Figure 7:
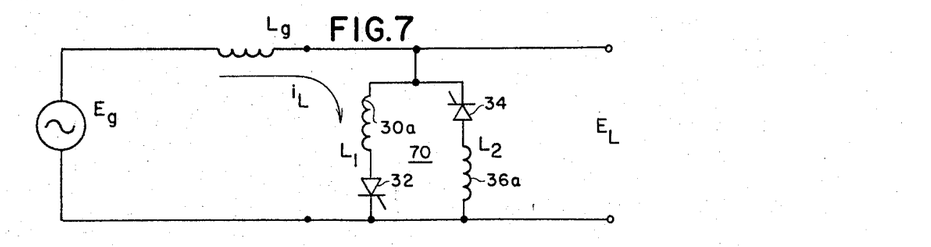
FIG. 7 is an equivalent circuit of a portion of the circuit of FIG. 3.

To understand how the projected generator internal voltage is provided during a positive half cycle at junction 41 and during a negative half cycle at junction 51, reference is made to FIG. 7. In this figure, $E_g$ is the internal voltage of generator 10 of FIG. 1. The internal impedance of generator 10 can be represented as a pure reactance, $L_g$. In FIG. 7, $i_L$ is the current through the parallel arrangement 70 of the series combinations of inductor 30a and silicon controlled rectifier 32 and inductor 36a and silicon controlled rectifier 34. If there is current in the parallel combination, then the line voltage is $$E_L = E_g - L_g \frac{di_L}{dt} \qquad (1)$$

wherein $E_g$ is the generator internal voltage and $L_g$ is the generator internal impedance. The voltage across impedance $L_g$ caused by load current is not considered in Equation 1 for it would be there whether or not there is current in parallel arrangement 70.

By rearranging Equation 1 for the voltage $E_g$, there is obtained the expression $$E_g = E_L + L_g \frac{di_L}{dt} \qquad (2)$$

There is a voltage proportional to $E_L$ present at junction 41 during the positive half cycle and at junction 51 during the negative half cycle. If a signal proportional to $$\frac{di_L}{dt}$$

at the proper scale is added to junctions 41 and 51 respectively, breakdown diodes 44 and 54 would sense the generator internal voltage, $E_g$.

In connection with the above, it is seen that when current flows through silicon controlled rectifier 34, then the voltage drop across inductor 36a is equal to $$L_2 \frac{di_L}{dt}$$

By changing the voltage scale at this drop, it can be made proportional to $$L_g \frac{di_L}{dt}$$

If this proportional voltage is added to that already at the junction 41, the voltage at junction 41 is consequently proportional to the sum of the line voltage, $E_L$, and the generator internal impedance drop caused by the current through parallel arrangement 70 is $$L_g \frac{di_L}{dt}$$

Thus, the voltage at junction 41 satisfies Equation 2 and would be proportional to the generator voltage which would exist if there were no current flowing in parallel arrangement 70, i.e. inductor 36a and silicon controlled rectifier 34. Such projected voltage, which is proportional to $$L_2 \frac{di_L}{dt}$$

appears on inductor 36b, is changed in scale by the turns ratio between inductor 36a and inductor 36b and is added to voltage at the junction 41 through diode 62 and resistor 64.

In FIG. 3, diode 40 protects breakdown diode 44 and the gate electrode of silicon controlled rectifier 32 from negative current by preventing current flow through the voltage divider comprising resistors 38 and 42 during negative half cycles, and diode 50 serves the same purpose by correspondingly preventing inductor 36b from applying negative voltage to breakdown diode 54. Diode 50 also prevents any loading at junction 41 by resistor 64 and inductor 36b when there is no current in inductor 36a. This arrangement insures, accordingly, that the projected voltage sensing does not alter the firing voltage of the silicon controlled rectifiers for a first half cycle of overvoltage. Diodes 40 and 50 also function to prevent any current flow in inductor 36b when the voltage is within limits and only the sensing current is being drawn from the line. This is necessary for proper functioning of the circuit, as shown in FIG. 1, for example, in supplying the actuating signal to voltage regulator 16 and which is further explained hereinbelow.

Since it is desired in accordance with the invention to eliminate transients almost instantaneously from the line by attenuating a peak generator voltage output to a peak line voltage which may be only a small fraction, i.e., as little as one-third of the generator voltage, the voltage in the line with current continually flowing in alternate half cycles through silicon controlled rectifiers 32 and 34 is always the aforesaid fraction of the generator voltage. Consequently, voltage regulator 16 (FIG. 1), which senses the line voltage, will "see" an undervoltage when current flows through silicon controlled rectifiers 32 and 34. The action of voltage regulator 16 would tend to increase the current in field winding 14 when the limiting action of silicon controlled rectifiers 32 and 34 is initiated to run the generated voltage to ceiling and thereby insure that silicon controlled rectifiers 32 and 34 are continually conductive in alternate half cycles of line voltage. Consequently, voltage regulator 16 and the limiter comprising the parallel arrangement 70 (FIG. 7) of the series combinations of inductor 30a and silicon controlled rectifier 32, and inductor 36a and silicon controlled rectifier 34 would lock in and the only way to deactivate the parallel arrangement would be to shut down the system. Accordingly, in order to obtain the proper desired functioning of the voltage limiter 18, a signal has to be provided therefrom to voltage regulator 16 to cause voltage regulator 16 to reduce the output voltage of generator 10 when the limiter is actuated. One way of providing this signal is to permit voltage regulator 16 to sense the generator internal voltage unaffected by the voltage drop in the line caused by the action of voltage limiter 18. Such a voltage could be reconstructed from the line voltage and voltage limiter current similarly to the reconstruction of the projected generator internal voltage within the voltage limiter as has been shown hereinabove.

Another arrangement for effecting the production of the signal from voltage limiter 18 to the voltage regulator 16 for reducing the internal voltage of the generator when the limiter 18 is actuated is to provide a signal from voltage limiter 18, which may be fed to voltage regulator 16, to make up the difference in voltage when the limiter is actuated.

Figure 8:
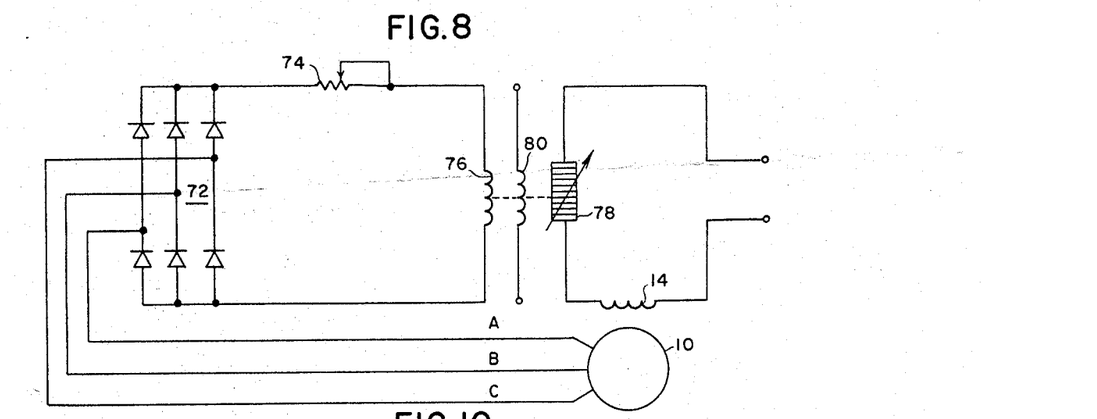
FIG. 8 is a schematic diagram of a circuit suitable for use as the voltage regulator shown in FIG. 1.

In FIG. 8, there is shown a simplified circuit suitable for use as voltage regulator 16 in FIG. 1. This circuit is the conventional carbon pile regulator in which the three phase output from generator 10 on lines A, B, and C respectively is full-wave rectified in a three-phase full wave rectifier bridge generally designated by the numeral 72. The direct current produced by the combining of these three rectified outputs is applied across the series arrangement of a variable resistor 74 and a control winding 76 of the carbon pile regulator. Current consequently flowing through winding 76 induces a magnetic field which moves a solenoid armature (not shown) and thereby changes the resistance of the carbon pile. An increase in line voltage increases the current through control winding 76 which causes the solenoid armature to move to increase the resistance of carbon pile 78. Since carbon pile 78 is in series arrangement with the field coil 14 of generator 10, this increase in the resistance of carbon pile 78 consequently reduces the current flowing in generator field 14 thereby reducing the overvoltage at the output of generator 10. A stabilizing winding 80 is included on the carbon pile to insert a change in the solenoid position to improved dynamic performance. This winding is the one that is utilized to insert the control signal from voltage limiter 18 into the voltage regulator.

To obtain the desired performance, the signal from voltage limiter 18 has to be of a proportion to replace the losses in the current through control winding 76 caused by the presence of voltage limiter 18. In other words, if limiter 18 is actuated in only one phase, a current to winding 76 should be supplied which is proportional to the loss in voltage in three phase full-wave bridge rectifier 72 when the voltage in one phase is much smaller than the other two. If all three phase outputs of generator 10 are being limited, the limiter should supply a signal proportional to the loss in voltage at rectifier 72 when all three phase voltages are reduced. Such signal may be supplied by producing a three-phase signal whose voltage is proportional to the voltage drop from the limiter and rectifying it in a full-wave bridge. Thus, the the sine wave voltage proportional to limiter voltage drop is obtained in each phase, for example, in circuit 3c by inductors 30c and 36c, which are effectively tertiary windings in transformer relationship with inductors 30a and 30b, and 36a and 36b, respectively, and is correspondingly obtained in circuits 3b and 3a by inductors $3b_3$ and $3b_4$, and by inductors $3a_3$ and $3a_4$. The outputs of inductors 30c and 36c are combined and full-wave rectified in rectifier 82; the outputs of inductors $3b_3$ and $3b_4$ are combined and full-wave rectified in rectifier 84; and the outputs of inductors $3a_3$ and $3a_4$ are combined and full-wave rectified in rectifier 86. The outputs of rectifiers 82, 84, and 86 are added in parallel to effectively give the same output as if a three phase full-wave bridge rectifier had been utilized. The advantage in the arrangement of FIG. 3 is that in the operation of a three phase bridge rectifier, each phase utilizes the others as a return path during part of a cycle. However, rectifying each phase separately avoids possible complications because of nonsinusoidal waveforms or the absence of any voltage at all on one or more of the phases.

Any current flowing through inductors, 30b and 36b, for example, in circuit 3c, appears as a small voltage across inductors 30a and 30c, and 36a and 36c, respectively. Any voltage across inductors 30c and 36c are full-wave rectified and the full-wave rectified voltage is applied to winding 80 in FIG. 8 of the carbon pile regulator, thereby changing the set point thereof. Diodes 40 and 62, and 50 and 58, accordingly, also function to block current in both directions from entering inductors 30b and 36b respectively when voltage limiter 18 is connected across the line, but is not actuated. This prevents the changing of the set point voltage of the carbon pile regulator when the voltage limiter is not actuated, i.e., limiting.

The action caused by the correction signal which is fed from the circuit of FIG. 3 to winding 80 is proportional to the current through winding 80. Since this winding is subject to wide temperature variations due to the heat generated in the carbon pile itself, it has large variations in resistance. Accordingly, it is desirably driven from a current source.

To provide high driving impedances to produce such current source and to permit an adjustment of each phase voltage, variable resistors 83, 85, and 87 are placed ahead of each of full-wave rectifiers 82, 84, and 86 respectively.

Figure 9A:
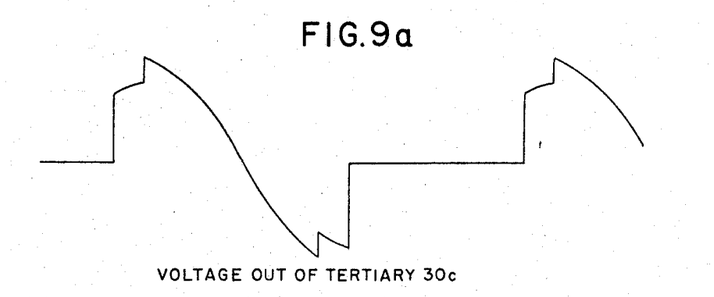
FIG. 9 is a timing diagram of waveforms conveniently utilized in explaining the operation of the circuit of FIG. 8.
Figure 9B:
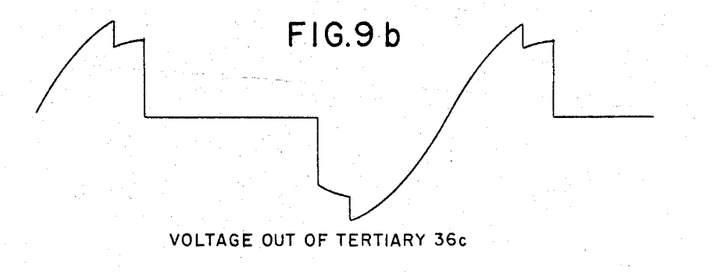
Figure 9C:
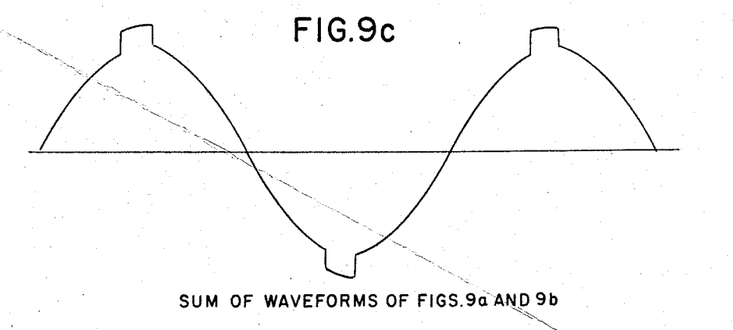

In FIG. 9, there is shown a timing diagram of the waveforms of the voltages appearing in inductors 30c and 36c and the result of their phasor addition. Thus, FIG. 9a shows the voltage out of inductor 30c and FIG. 9b shows the voltage out of inductor 36c. The notches in these waveforms result from the overlapping of the currents in silicon controlled rectifiers 32 and 34. FIG. 9c shows the waveform which is the sum of waveforms of FIGS. 9a and 9b and which is full-wave rectified and added in parallel to that from the other two circuits 3b and 3a of FIG. 3 to produce a signal on winding 80 of the voltage regulator proportional to the voltage drop in the circuit of FIG. 3. It is to be noted that in FIG. 9c, the notches in the waveforms of FIGS. 9a and 9b become projections in the resulting addition.

Since it is desired to obtain an almost absolutely instantaneous limiting of an overvoltage in the output of generator 10, it is preferable that the resistors utilized in the voltage limiter be completely noninductive. The breakdown time of the breakdown diodes is quite small, possibly in the order of 0.3 milli-microsecond and accordingly, the only time delay that may exist is that required to gate into conductivity, a silicon controlled rectifier 32 or 34.

When a gating pulse is applied to the gate of a silicon controlled rectifier, there are two time effects which take place. First, there is a delay time which is approximately one microsecond for gate pulses having an amplitude just large enough to render the silicon controlled rectifier conductive. This time can be reduced by considerably overdriving the gate with a large fast rising pulse. Such delay has a minimum value of slightly less than 0.5 microsecond. Once this delay is over, current in the gated silicon controlled rectifier increases with a rate of rise which is a function of the applied anode voltage and current.

Figure 10:
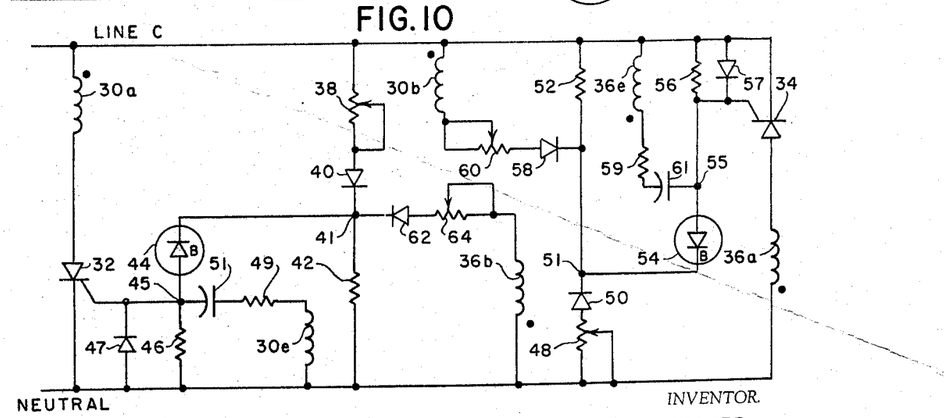
FIG. 10 is a second embodiment of a voltage limiter constructed in accordance with the principles of the invention.

In FIG. 10 there is shown a limiter circuit for minimizing such firing delay. Of course, it is realized that this is a limiter circuit for one phase of the output of a three phase generator and that three such circuits are utilized similar to the arrangement of FIG. 3. The circuit of FIG. 10 is substantially similar to that of each component, viz; circuits 3c, 3b, and 3a of the arrangement of FIG. 3, and accordingly, like components in the circuit of FIG. 10 and circuit 3c have the same designating numerals. However, the circuit of FIG. 10 further includes the cathode to anode path of a diode 47 connected in shunt with resistor 46, the cathode to anode path of a diode 57 connected in shunt with resistor 56, a series arrangement of a pulse winding 30e in transformer relationship with inductors 30a and 30b, a resistor 49 and a capacitor 51 connected between neutral and junction 45 and a series arrangement of a pulse winding 36e in transformer relationship with inductors 36a and 36b, a resistor 59, and a capacitor 61 connected between line C and junction 55.

In the circuit of FIG. 10, the values of the circuit components are so chosen whereby the amplitude of the pulses applied to the gates of respective silicon controlled rectifiers 32 and 34 is equal to the amount by which line voltage exceeds the chosen limiting value reduced by the resistance ratio of the dividers comprising resistors 38 and 42 and resistors 48 and 52 respectively. The breakdown diodes are suitably chosen to be of a relatively high voltage type so that the attenuation ratio is kept small. Resistors 38 and 42, and resistors 48 and 52 are chosen to have relatively small values to permit large gate currents to be supplied by small overvoltages.

Since the output impedance of generator 10 is inductive, as soon as current starts to flow in the circuit of FIG. 10 because of an overvoltage transient, a voltage drop in accordance with the expression $$L_g \frac{di}{dt}$$

drops the line voltage below the chosen limit. This removes the voltage from the gate of the silicon controlled rectifier. Thus, there is no drive on the silicon controlled rectifier during the buildup of current. Since the presence of the gate signal speeds current turn on, silicon controlled rectifier 32 and silicon controlled rectifier 34 are connected as blocking oscillators by inserting pulse windings 30e and 36e. Thus, when a winding such as 30e or 36e picks up a large positive pulse on a sharp rise of current, such pulse is applied to the gate electrode of either silicon controlled rectifier 32 and 34 respectively to drive the silicon controlled rectifiers full on during current buildup.

The ratio between an inductor 30a or 36a and a pulse winding, 30e or 36e respectively, is chosen to provide a substantially heavy pulse when a step voltage occurs in inductors 30a and 36a respectively. Resistors 49 and 59 are chosen to have values respectively to limit the maximum gate current to a safe value. Capacitors 51 and 61 are respectively chosen to have values such that a series arrangement, for example, of capacitor 51 and the parallel combination of resistor 46 and the impedance of the gate electrode of silicon controlled rectifier 32 and, correspondingly, the series arrangement of capacitor 61 and the parallel combination of resistor 56 and the impedance of the gate of silicon controlled rectifier 34 have a predetermined low value time constant. Diodes 47 and 57 respectively are included to prevent the application of negative pulses to the gate electrodes of silicon controlled rectifiers 32 and 34.

Figure 11A:
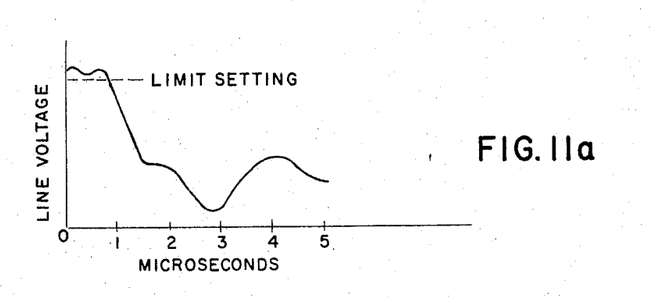
FIG. 11 is a timing diagram of waveforms conveniently utilized to explain the operation of the circuit of FIG. 10.
Figure 11B:
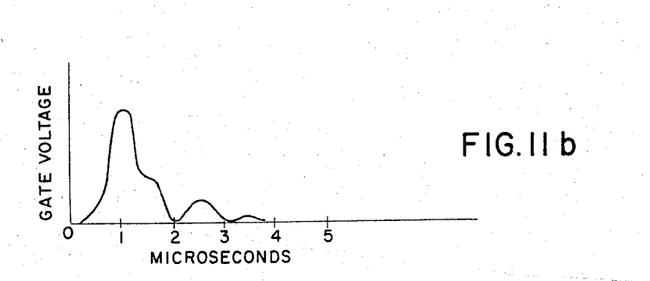
Figure 11C:
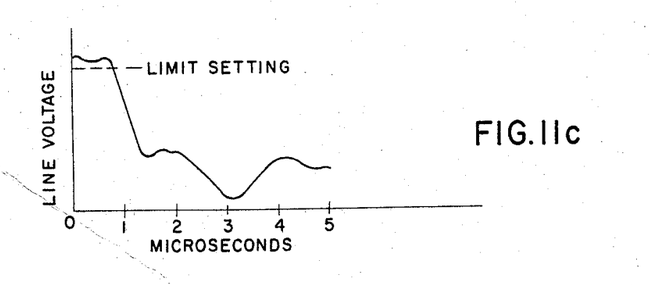

In FIG. 11, there are shown waveforms which result from the appearance of a step voltage in inductor 30a in FIG. 10. FIG. 11a shows line voltage when pulse winding 30b is not included in the circuit. FIG. 11b shows the pulse waveform produced in winding 30e during a step voltage in inductor 30a and FIG. 11c shows the waveform of the line voltage with the pulse winding present. These waveforms result from a suddenly applied 10 percent overvoltage.

It has been found that if the projected voltage sensing arrangement in accordance with the principles of this invention are connected and adjusted to provide just a little more than the voltage defined by the expression $$L_g \frac{di}{dt}$$

i.e., more than is needed to get a good sine wave at the sensing junctions, i.e., junctions 41 and 51, the performance of the voltage limiter is quite sharp. Thus, as the generator voltage is gradually increased, the first silicon controlled rectifier to be fired applies the voltage to the sensing arrangement of the opposite polarity silicon controlled rectifier which enables the silicon controlled rectifier of such opposite polarity to be fired more easily. This second silicon controlled rectifier then has the same effect on the first silicon controlled rectifier. Thus, the first silicon controlled rectifier to conduct in a phase of a voltage limiter causes the limiter to come full on with a slightly overlapping current which makes the firing voltage of the limiter much more repeatable.

As voltage is gradually reduced at the output terminals of generator 10, the limiter tends to stay actuated full-on to a voltage somewhere below that where it initially actuates. The slight excess in the projected voltage holds it on. Since at this point, the output of the generator is a little below the voltage at which the limiter was originally actuated, neither silicon controlled rectifier can be fired without projected voltage sensing so that the first silicon controlled rectifier which once fails to fire releases, i.e., deactuates the limiter completely.

By adjusting the projected voltage sensing with taps on inductors 30b and 36b, for example, or with the adjusting of variable desistors 38 or 48 respectively, the difference between the voltage at which the limiter is actuated and at which it is deactuated can be adjusted. Such difference between "pick-up" and "drop-out" voltages is an aid in stabilizing the system.

While there have been described what are considered to be the preferred embodiments of this invention, it will be obvious to those skilled in the art that various changes and modifications may be made therein without departing from the invention and it is, therefore, aimed in the appended claims to cover all such changes and modifications as fall within the spirit and scope of the invention.

What is claimed as new and desired to be secured by Letters Patent of the United States is:

1. In combination with an alternating current power source, a parallel arrangement of first and second oppositely poled gate controlled rectifiers connected across said source, first means connected across said source for providing gating signals to said first gate controlled rectifier in response to half cycles of output from said source of one polarity which exceed a chosen value, second means connected across said source for providing gating signals to said second gate controlled rectifier in response to half cycles of output from said source of the opposite polarity and which exceed said chosen value, means responsive to conductivity in said first gate controlled rectifier during half cycles of said opposite polarity for producing a potential in additive relationship with the output of said second signal gating means to provide gating signals to said second gate controlled rectifier, and means responsive to conduction in said second gate controlled rectifier during half cycles of said one polarity for producing a potential in additive relationship with the output of said first signal gating means to provide gating signals to said first gate controlled rectifier.

2. In combination with an alternating current power source, a parallel arrangement of first and second oppositely poled gate controlled rectifiers connected across said source, first means connected across said source for providing gating signals to said first gate controlled rectifier in response to half cycles of output from said source of one polarity which exceed a chosen value, second means connected across said source for providing gating signals to said second gate controlled rectifier in response to half cycles of output from said source of the opposite polarity and which exceed said chosen value, means responsive to conductivity in said first gate controlled rectifier during half cycles of said opposite polarity for producing a potential in additive relationship with the output of said second signal gating means to provide gating signals to said second gate controlled rectifier at the point in half cycles of said opposite polarity that said source voltage would have attained a value exceeding said chosen value in the absence of conduction in said first gate controlled rectifier, and means responsive to conduction in said second gate controlled rectifier during half cycles of said one polarity for producing a potential in additive relationship with the output of said first signal gating means to provide gating signals to said first gate controlled rectifier at the point in half cycles of said one polarity that said source voltage would have attained a value exceeding said chosen value in the absence of conduction in said second gate controlled rectifier.

3. In combination with an alternating current power source, a first series combination of a first inductor and a first gate controlled rectifier poled in one direction connected across said source, a second series combination of a second inductor and a second gate controlled rectifier poled in the opposite direction connected across said source, first means connected across said source for providing gating signals to said first gate controlled rectifier in response to half cycles of output of one polarity from said source which exceed a chosen value, second means connected across said source for providing gating signals to said second gate controlled rectifier in response to half cycles of output from said source of the opposite polarity and which exceed said chosen value, a first secondary winding transformer coupled to said first inductor and in circuit with said second gating signal means and responsive to conduction in said first series combination during half cycles of said opposite polarity for providing a first potential in additive relationship with the output of said second signal gating means to provide gating signals to said second gate controlled rectifier at the points in half cycles of said opposite polarity that said source voltage would have exceeded said chosen value in the absence of conduction in said first gate controlled rectifier, and a second secondary winding transformer coupled to said second inductor and in circuit with said first gating means for providing a second potential in additive relationship with the output of said first signal gating means to provide gating signals to said first gate controlled rectifier at the point in half cycles of said one polarity that said source voltage would have exceeded said chosen value in the absence of conduction in said second gate controlled rectifier.

4. In the combination defined in claim 3 wherein each of said gate controlled rectifiers comprises a gate electrode and wherein each of said gating signal means comprises a divided having a voltage division point, said first and second potentials being added to said respective division points, and wherein said combination further includes first and second gating signal deriving means respectively in circuit with a division point and a gate electrode.

5. In the combination defined in claim 4 wherein a gating signal deriving means comprises the series arrangement of a reversely poled breakdown diode and a resistor having a junction therebetween, a gate electrode being connected to said junction.

6. In the combination defined in claim 5 and further including first and second pulse winding means transformer coupled to said first and second inductors and in circuit with the gate electrodes of said first and second gate controlled rectifiers respectively.

7. In combination with an alternating current power source, a first series combination of a first inductor and a first gate controlled rectifier poled in one direction connected across said source, a second series combination of a second inductor and a second gate controlled rectifier poled in the opposite direction connected across said source, first means connected across said source for providing gating signals to said first gate controlled rectifier in response to half cycles of output of one polarity from said source which exceed a chosen value, second means connected across said source for providing gating signals to said second gate controlled rectifier in response to half cycles of output from said source of the opposite polarity and which exceed said chosen value, a first secondary winding transformer coupled to said first inductor and in circuit with said gating signal means and responsive to conduction in said first series combination during half cycles of said opposite polarity for providing a first potential in additive relationship with the output of said second signal gating means to provide gating signals to said second gate controlled rectifier at the points in half cycles of said opposite polarity that said source voltage would have exceeded said chosen value in the absence of conduction in said first gate controlled rectifier, a second secondary winding transformer coupled to said second inductor and in circuit with said first gating means for providing a second potential in additive relationship with the output of said first signal gating means to provide gating signals to said first gate controlled rectifier at the points in half cycles of said one polarity that said source voltage would have exceeded said chosen value in the absence of conduction in said gate controlled rectifier, means in circuit with said source for regulating the voltage therefrom, a first tertiary winding transformer coupled to said first inductor, a second tertiary winding coupled to said second inductor, means in circuit with said tertiary windings for combining and full wave rectifying the output therefrom, and means for applying said rectified output to said voltage regulating means to decrease commensurately the output of said regulating means in response to said last named application.

8. In the combination defined in claim 7 wherein said voltage regulating means is a carbon pile regulator having a stabilizing winding and wherein said rectified output is applied to said stabilizing winding in a direction to decrease the output of said regulating means in accordance with the amplitude of said rectified output.

9. In the combination defined in claim 8 wherein each of said gate controlled rectifiers comprises a gate electrode and wherein each of said gating signal means comprises a divider having a voltage division point, said first and second potentials being added to said respective division points, and wherein said combination further includes first and second gating signal deriving means respectively in circuit with a division point and a gate electrode.

10. In the combination defined in claim 9 and further including first and second pulse winding means transformer coupled to said first and second inductors and in circuit with the gate electrodes of said first and second gate controlled rectifiers respectively.

11. In combination with an alternating current power source having a given plurality of balanced phase outputs: said given plurality of voltage limiting arrangements, each in circuit with one of said outputs; each of said voltage limiting arrangements comprising a first series combination of a first inductor and a first gate controlled rectifier poled in one direction connected across said source, a second series combination of a second inductor and a second gate controlled rectifier poled in the opposite direction connected across said source, first means connected across said source for providing gating signals to said first gate controlled rectifier in response to half cycles of output of one polarity from said source which exceed a chosen value, second means connected across said source for providing gating signals to said second gate controlled rectifier in response to half cycles of output from said source of the opposite polarity and which exceed said chosen value, a first tertiary winding transformer coupled to said first inductor, a second tertiary winding transformer coupled to said second inductor; means in circuit with said tertiary windings for combining and full-wave rectifying the outputs therefrom; means in circuit with said source for regulating the voltage therefrom, means for combining in parallel arrangement said given plurality of full-wave rectified outputs, and means for applying the output of said parallel ararngement to said voltage regulating means to decrease commensurately the output of said regulating means in response to said last named application.

12. In combination with an alternating current source having a given plurality of balanced phase outputs: said given plurality of voltage limiting arrangements, each in circuit with one of said outputs; each of said voltage limiting arrangements comprising a first series combination of a first inductor and a first gate controlled rectifier poled in one direction connected across said source, a second series combination of a second inductor and a second gate controlled rectifier poled in the opposite direction connected across said source, first means connected across said source for providing gating signals to said first gate controlled rectifier in response to half cycles of output of one polarity from said source which exceed a chosen value, second means connected across said source for providing gating signals to said second gate controlled rectifier in response to half cycles of output from said source of the opposite polarity and which exceed said chosen value, a first secondary winding transformer coupled to said first inductor and in circuit with said second gating signal means and responsive to conduction in said first series combination during half cycles of said opposite polarity for providing a first potential in additive relationship with the output of said signal gating means to provide gating signals to said second gate controlled rectifier at the points in half cycles of said opposite polarity that said source voltage would have exceeded said chosen value in the absence of conduction in said first gate controlled rectifier, a second secondary winding transformer coupled to said second inductor and in circuit with said first gating means for providing a second potential in additive relationship with the output of said first signal gating means to provide gating signals to said first gate controlled rectifier at the points in half cycles of said one polarity that said source voltage would have exceeded said chosen value in the absence of conduction in said second gate controlled rectifier, a first tertiary winding transformer coupled to said first inductor, a second tertiary winding transformer coupled to said second inductor; means in circuit with said tertiary windings for combining and full-wave rectifying the outputs therefrom, means in circuit with said source for regulating the voltage therefrom, means for combining in parallel arrangement said given plurality of full-wave rectifier outputs, and means for applying the output of said parallel arrangement to said voltage regulating means to decrease commensurately the output of said regulating means in response to said last named application.

13. In the combination defined in claim 12 wherein said voltage regulating means is a carbon pile regulator having a stabilizing winding and wherein the output of said parallel arrangement is applied to said stabilizing winding in a direction to decrease the output of said regulating means commensurately with the amplitude of the output of said parallel arrangement.

14. In the combination defined in claim 13 wherein each of the gate controlled rectifiers comprises a gate electrode and wherein each gating signal means in a voltage limiting arrangement comprises a divider having a voltage division point, said first and second potentials being added to said respective division points, and further includes first and second gating signal deriving means respectively in circuit with a division point and a gate electrode.

15. In the combination defined in claim 14 wherein each voltage limiting arrangement further includes first and second pulse winding means transformer coupled to said first and second inductors and in circuit with the gate electrodes of said first and second gate controlled rectifiers respectively.

References Cited by the Examiner

"Notes on the Application of the Silicon Controlled Rectifier," General Electric Bulletin, December 1958, pp. 50–51.

JOHN F. COUCH, *Primary Examiner.*

LLOYD McCOLLUM, *Examiner.*

J. J. KISSANE, G. GOLDBERG, *Assistant Examiners.*